United States Patent
Hashiguchi et al.

(10) Patent No.: US 9,571,804 B2
(45) Date of Patent: Feb. 14, 2017

(54) OPTICAL TRANSMISSION SYSTEM

(71) Applicant: Nihon Video System Co., Ltd., Tsushima-shi, Aichi (JP)

(72) Inventors: Kentaro Hashiguchi, Tsushima (JP); Ken Tsuchiya, Tsushima (JP)

(73) Assignee: Nihon Video System Co., Ltd., Tsushima-shi (JP)

( * ) Notice: Subject to any disclaimer, the term of this patent is extended or adjusted under 35 U.S.C. 154(b) by 0 days.

(21) Appl. No.: 14/886,728

(22) Filed: Oct. 19, 2015

(65) Prior Publication Data
US 2016/0150198 A1  May 26, 2016

(30) Foreign Application Priority Data

Oct. 20, 2014 (JP) .................. 2014-213554

(51) Int. Cl.
*H04B 10/00* (2013.01)
*H04N 7/22* (2006.01)
*H04B 10/2575* (2013.01)
*H04N 5/38* (2006.01)
*H04N 7/045* (2006.01)

(52) U.S. Cl.
CPC .......... *H04N 7/22* (2013.01); *H04B 10/25751* (2013.01); *H04N 5/38* (2013.01); *H04N 7/045* (2013.01)

(58) Field of Classification Search
CPC ............ H04N 7/22; H04N 7/045; H04N 5/38; H04B 10/25751
USPC .................................................. 398/115–117
See application file for complete search history.

(56) References Cited

U.S. PATENT DOCUMENTS

| 4,061,577 A | * | 12/1977 | Bell ..................... | G02B 6/3847 348/473 |
| 4,893,300 A | * | 1/1990 | Carlin ..................... | H04J 1/14 398/32 |
| 5,311,543 A | * | 5/1994 | Schreiber ............... | H04B 1/707 375/141 |
| 5,351,148 A | * | 9/1994 | Maeda ................. | H04B 10/504 348/E7.094 |

(Continued)

FOREIGN PATENT DOCUMENTS

| JP | 2003-298935 A | 10/2003 |
| JP | 2006-191161 A | 7/2006 |
| JP | 2011-114561 A | 6/2011 |

OTHER PUBLICATIONS

Notification of Reasons for Refusal, mailed Feb. 17, 2015, issued in corresponding Japanese Application No. 2014-213554, filed Oct. 20, 2014, 8 pages.

*Primary Examiner* — Ken N Vanderpuye
*Assistant Examiner* — Dibson Sanchez
(74) *Attorney, Agent, or Firm* — Christensen O'Connor Johnson Kindness PLLC

(57) ABSTRACT

Provided are an optical transmission system in which one can easily set a video signal cable, and an adapter that can be used in this system. There is provided an adapter for use in an optical transmission system in which an analog video signal or a digital video signal is transmitted between a pair of adapters using light. The adapter includes a first signal determination unit configured to make a determination as to whether a first electrical signal inputted to a common input terminal is an analog video signal or a digital video signal.

7 Claims, 2 Drawing Sheets

(56) References Cited

U.S. PATENT DOCUMENTS

| | | | | | |
|---|---|---|---|---|---|
| 5,425,050 | A | * | 6/1995 | Schreiber | H04B 1/707 348/384.1 |
| 5,483,373 | A | * | 1/1996 | Bulow | H04B 10/504 398/185 |
| 5,532,748 | A | * | 7/1996 | Naimpally | H04N 5/4401 348/554 |
| 5,570,219 | A | * | 10/1996 | Shibutani | H04B 10/58 398/158 |
| 5,680,238 | A | * | 10/1997 | Masuda | H04J 14/0298 398/76 |
| 5,748,348 | A | * | 5/1998 | Heidemann | H04H 20/69 348/E7.094 |
| 5,774,195 | A | * | 6/1998 | Miyahara | H04N 5/46 348/554 |
| 5,825,518 | A | * | 10/1998 | Maeda | H04J 14/0298 398/183 |
| 6,118,479 | A | * | 9/2000 | Maeda | H04L 1/20 348/180 |
| 6,377,316 | B1 | * | 4/2002 | Mycynek | H04B 1/0003 348/638 |
| 6,633,325 | B1 | * | 10/2003 | Lee | H04N 5/211 348/21 |
| 7,477,327 | B2 | * | 1/2009 | Okuma | H04N 5/4401 348/555 |
| 2005/0159179 | A1 | * | 7/2005 | Sainton | H04L 12/14 455/552.1 |
| 2006/0067698 | A1 | * | 3/2006 | Chan | H04B 10/25751 398/141 |
| 2006/0228117 | A1 | * | 10/2006 | Takeuchi | H04B 10/504 398/183 |
| 2007/0147848 | A1 | * | 6/2007 | Vieira | H04B 10/505 398/183 |

\* cited by examiner

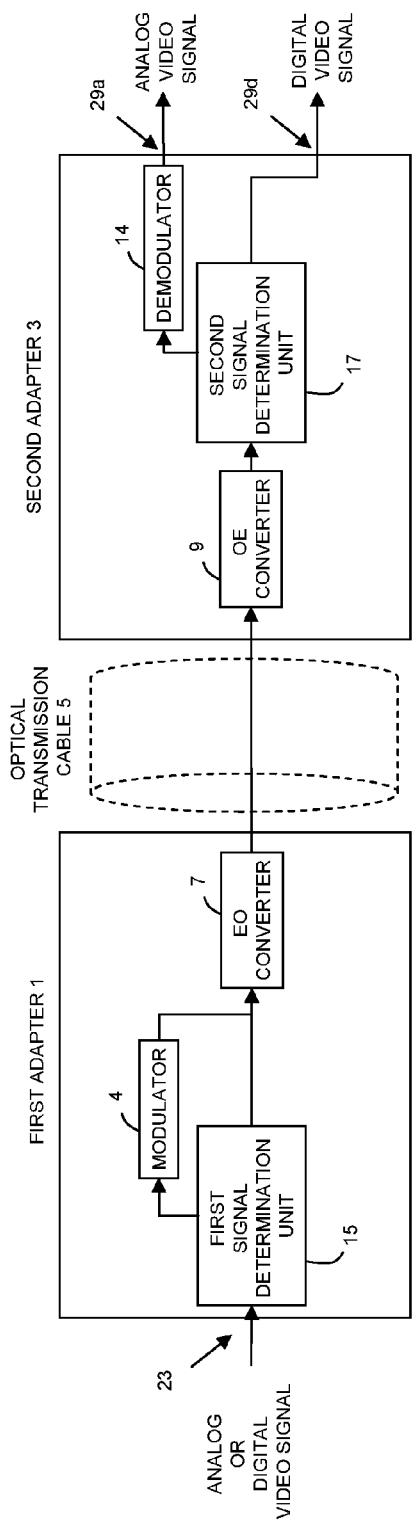
FIG. 1 FIRST EMBODIMENT
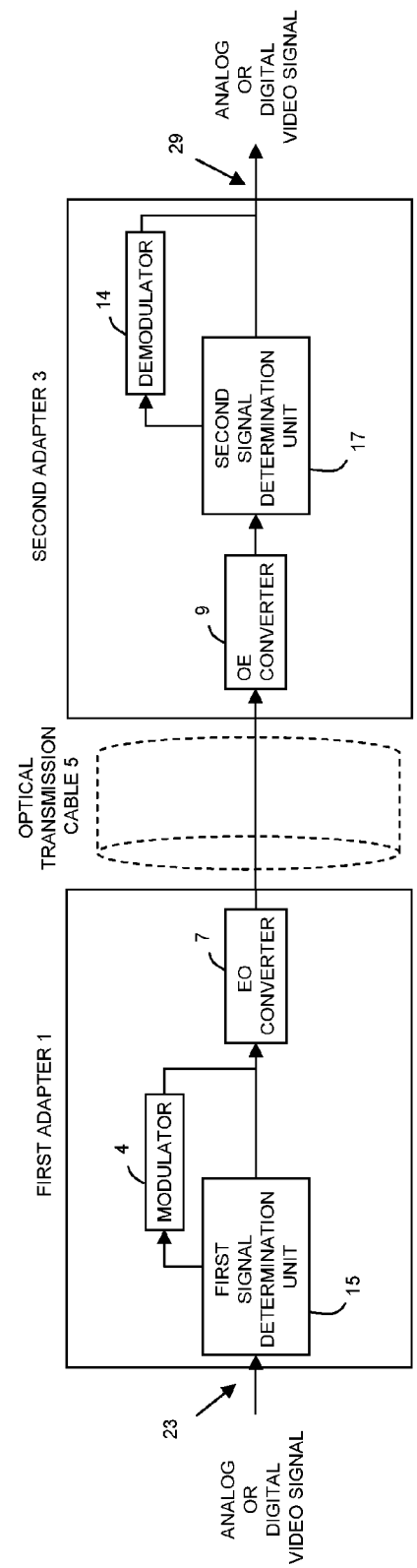
FIG. 2 SECOND EMBODIMENT

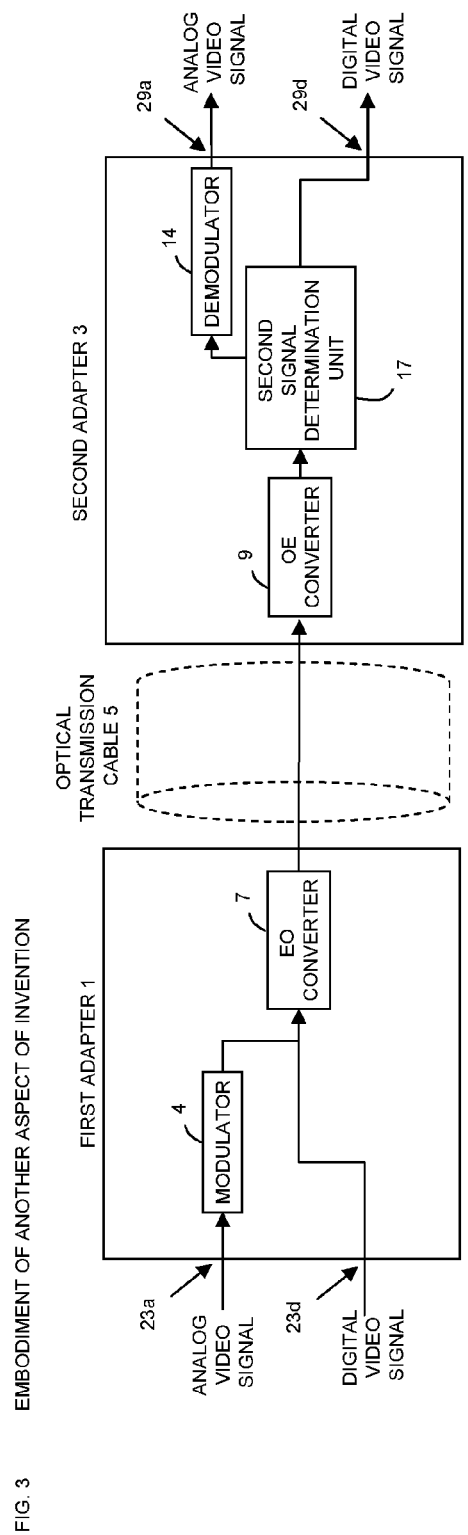

OPTICAL TRANSMISSION SYSTEM

TECHNICAL FIELD

The present invention relates to an optical transmission system in which an analog video signal or digital video signal is transmitted between a pair of adapters using light, and an adapter for use in this optical transmission system.

BACKGROUND ART

A video signal of an image captured by a video camera is transmitted to a video switcher or the like through a transmission cable. However, if such an apparatus is installed in a remote location, it is difficult to transmit the electrical signal without attenuating it. For this reason, long-distance transmission is performed by converting an electrical signal into an optical signal on the video camera side, transmitting this optical signal through an optical transmission cable, and converting the optical signal into an electrical signal on the remote apparatus side (see Japanese Unexamined Patent Application Publication No. 2006-191161).

SUMMARY OF INVENTION

Thanks to technological development, video signals have been digitized in recent years. On the other hand, apparatuses that output a conventional analog video signal, such as an analog composite signal or analog HD-Y signal, are still being used widely. For this reason, both analog video signals and digital video signals are being used in image-capturing locations. As used herein, a "digital video signal" refers to a signal conforming to a digital video signal transmission standard, such as SD-SDI, HD-SDI, or 3G-SDI.

To allow both analog video signals and digital video signals to be transmitted using light, an adapter in an optical transmission system is provided with an analog video signal input terminal and a digital video signal input terminal. One connects a video signal cable to the analog video signal input terminal when the apparatus outputs an analog video signal; one connects another video signal cable to the digital video signal input terminal when the apparatus outputs a digital video signal. Thus, both analog video signals and digital video signals can be transmitted using light.

Such an optical transmission system is very convenient, since it can transmit a video signal over a long distance regardless of the type of the video signal. However, when the present inventors actually captured images using such an optical transmission system, they found that it was troublesome to connect a video signal cable to an input terminal of an adapter considering the type of a video signal to be passed through the video signal cable, or they connected the video signal cable to a wrong input terminal. That is, it was not easy to set the video signal cable.

The present invention has been made in view of the foregoing, and an object thereof is to provide an optical transmission system which allows one to easily set a video signal cable, and an adapter that can be used in this system.

The present invention provides an adapter for use in an optical transmission system in which an analog video signal or a digital video signal is transmitted between a pair of adapters using light. The adapter includes a first signal determination unit configured to make a determination as to whether a first electrical signal inputted to a common input terminal is an analog video signal or a digital video signal.

To allow one to easily set a video signal cable, the present inventors investigated intensively. The present inventor then found that one could easily set a video signal cable if an adapter was connected to receive both analog video signals and digital video signals at a common input terminal and to determine whether an inputted electrical signal was an analog video signal or digital video signal, and then completed the present invention.

Various embodiments of the present invention will be described below. Any of the embodiments described below can be combined with each other.

Preferably, the first signal determination unit makes the determination on the basis of whether the first electrical signal contains a synchronous signal.

Preferably, the adapter further includes a modulator configured to, if the first electrical signal is an analog video signal, modulate a carrier wave having a lower frequency than a transmission frequency of a digital video signal into a modulated electrical signal using the analog video signal. Preferably, the adapter further includes an EO converter configured to convert any of an electrical signal derived from an analog video signal and an electrical signal derived from a digital video signal into an optical signal of an identical wavelength.

Another aspect of the present invention provides an optical transmission system includes a first adapter including the above adapter and a second adapter capable of optical transmission with the first adapter. An analog video signal or a digital video signal is transmitted between the first and second adapters using light. The second adapter includes an OE converter configured to convert the optical signal into a second electrical signal, a second signal determination unit configured to make a determination as to whether the second electrical signal is derived from an analog video signal or a digital video signal, and a demodulator configured to, if the second electrical signal is derived from an analog video signal, demodulate the second electrical signal into the analog video signal.

Yet another aspect of the present invention provides an optical transmission system including first and second adapters. An analog video signal or a digital video signal is transmitted between the first and second adapters using light. The first adapter includes a modulator configured to modulate a carrier wave having a lower frequency than a transmission frequency of a digital video signal into a modulated electrical signal using the analog video signal and an EO converter configured to convert any of an electrical signal derived from an analog video signal and an electrical signal derived from a digital video signal into an optical signal of an identical wavelength. The second adapter includes an OE converter configured to convert the optical signal to a second electrical signal, a second signal determination unit configured to make a determination as to whether the second electrical signal is derived from an analog video signal or a digital video signal and a demodulator configured to, if the second electrical signal is derived from an analog video signal, demodulate the second electrical signal into the analog video signal.

Preferably, any of an analog video signal and a digital video signal is outputted from a common output terminal of the second adapter.

Preferably, the second signal determination unit makes the determination on the basis of strength of frequency components of the carrier wave contained in the second electrical signal.

BRIEF DESCRIPTION OF THE DRAWINGS

FIG. 1 is a block diagram showing an optical transmission system of a first embodiment of the present invention;

FIG. 2 is a block diagram showing an optical transmission system of a second embodiment of the present invention; and FIG. 3 is a block diagram showing an optical transmission system of an embodiment of another aspect of the present invention.

DESCRIPTION OF EMBODIMENTS

Now, embodiments of the present invention will be described with reference to the drawings.

1. First Embodiment

1-1. Configuration of Optical Transmission System

Referring now to FIG. 1, an optical transmission system of a first embodiment of the present invention will be described. In the optical transmission system of the present embodiment, an analog video signal or digital video signal is transmitted between a first adapter 1 and a second adapter 3 using light. For example, the first adapter 1 is a camera adapter connected to a video camera by wire, and the second adapter 3 is a base station located remotely from the video camera. For another example, the second adapter 3 is a camera adapter connected to a video camera by wire, and the first adapter 1 is a base station located remotely from the video camera. An outside broadcast van or an apparatus such as video switcher is connected to the base station. While FIG. 1 shows that a video signal is being transmitted from the first adapter 1 to the second adapter 3 in one direction for convenience, a video signal may be transmitted from the second adapter 3 to the first adapter 1 in a similar configuration.

The respective elements will be described below.

1-2. First Adapter 1

The first adapter 1 includes an input terminal 23, a first signal determination unit 15, a modulator 4, and an EO converter 7.

The first signal determination unit 15 determines whether a first electrical signal inputted to the common input terminal, 23, is an analog video signal or a digital video signal. In the present embodiment, any of an analog video signal cable and a digital video signal cable can be connected to the common input terminal, 23, and therefore it is very easy to set a video signal cable. The other end of the video signal cable is connected to a video output apparatus, such as a video camera or switcher. For example, in the case of a conventional adapter having eight input terminals, the eight input terminals are typically composed of four analog video signal input terminals and four digital video signal input terminals. However, there may be an image-capturing location that requires no digital video signal input terminal but rather requires five or more analog video signal input terminals. This image-capturing location is short of analog video signal input terminals and therefore another adapter has to be provided. On the other hand, for eight input terminals according to the present embodiment, they can be used for any of analog video signals and digital video signals and therefore can be all used for analog video signals. For this reason, the present embodiment has an advantage that the number of input terminals is substantially increased depending on the application.

The first signal determination unit 15 may use any method to determine the type of the inputted first electrical signal (whether the first electrical signal is an analog video signal or digital video signal). For example, the first signal determination unit 15 may determine the type of the first electrical signal on the basis of whether the first electrical signal contains a synchronous signal, since an analog video signal contains a characteristic synchronous signal (horizontal synchronous signal and vertical synchronous signal).

If the first electrical signal is determined to be an analog video signal, the modulator 4 operates to modulate a carrier wave having a lower frequency than the transmission frequency of a digital video signal into a modulated electrical signal using the analog video signal. The transmission frequency of a digital video signal is 270 MHz in SD-SDI; about 1.5 GHz in HD-SDI; and about 3 GHz in 3G-SDI. Accordingly, a carrier wave having a lower frequency than these frequencies can be used. By using such a carrier wave, a second signal determination unit 17 can make an analog/digital determination. The frequency of the carrier wave is preferably 100 MHz or less, more preferably 50 MHz or less, most preferably 25 MHz or less. The lower limit of the frequency of the carrier wave is not limited to a particular frequency, but is, for example, 12 MHz. This is because if the frequency of the carrier wave is lower than 12 MHz, it is difficult to transmit the analog video signal.

If the first electrical signal is determined to be a digital video signal, it is transmitted directly to the EO converter 7, or subjected to predetermined coding and then transmitted thereto.

The EO converter 7 converts any of an electrical signal derived from an analog video signal and an electrical signal derived from a digital video signal into an optical signal of the same wavelength. Conventionally, if a single optical fiber is commonly used by analog video signals and digital video signals, an analog video signal is digitized and then transmitted as a digital signal using light, or an analog video signal is transmitted using light of a different wavelength (that is, by wavelength multiplexing). The former approach requires the successive steps of the digitization of the analog video signal, optical transmission, and conversion to analog form and therefore may cause problems such as synchronization loss during the digitization or conversion to analog form. The latter approach, on the other hand, requires determining whether the signal to be transmitted is an analog video signal or digital video signal and then selecting an optical wavelength to be used. Thus, the configuration is complicated. Unlike these conventional technologies, the EO converter 7 of the present embodiment converts any of an electrical signal derived from an analog video signal and an electrical signal derived from a digital video signal into an optical signal of the same wavelength. Accordingly, the EO converter 7 does not have to digitize an analog video signal nor has to determine whether the signal to be transmitted is an analog video signal or digital video signal or to select an optical wavelength to be used. As a result, the configuration is simple. Further, light of any wavelength can be used to transmit analog video signals and digital video signals. Thus, the degree of wavelength multiplexing can be increased.

The EO converter 7 then outputs the optical signal to the second adapter 3 through an optical transmission cable 5.

1-3. Second Adapter 3

The second adapter 3 includes an OE converter 9, the second signal determination unit 17, a demodulator 14, and output terminals 29a, 29d.

The OE converter 9 converts the optical signal from the first adapter 1 into a second electrical signal.

The second signal determination unit 17 determines whether the second electrical signal is derived from an analog video signal or digital video signal. In the present embodiment, as described above, any of an electrical signal derived from an analog video signal and an electrical signal derived from a digital video signal is converted into an optical signal of the same wavelength. Accordingly, whether the second electrical signal is derived from an analog video signal or digital video signal cannot be determined on the basis of the wavelength of the optical signal. The conventional technology has difficulty in making this determination and therefore transmits analog video signals and digital video signals using light of different wavelengths. In the present embodiment, on the other hand, the carrier wave of an analog video signal has a lower frequency than the transmission frequency of a digital video signal and therefore the above determination is made on the basis of the strength of the frequency components of the carrier wave contained in the second electrical signal. For example, if the frequency of the carrier wave is 16 MHz and the second electrical signal is derived from an analog video signal, the strength of the components of 16 MHz of the second electrical signal is extremely strong. In contrast, if the second electrical signal is derived from a digital video signal, the strength of the components of 16 MHz of the second electrical signal is weak. Accordingly, if the strength of the frequency components of the carrier wave contained in the second electrical signal exceeds a predetermined threshold, the second signal determination unit 17 can determine that the second electrical signal is derived from an analog video signal. For example, the second signal determination unit 17 may include a parallel resonant circuit that resonates at around the frequency of the carrier wave.

If the second electrical signal is determined to be derived from an analog video signal, the demodulator 14 operates to demodulate the second electrical signal into the analog video signal.

In contrast, if the second electrical signal is determined to be derived from a digital video signal, it is outputted directly to the outside as a digital video signal, or subjected to predetermined decoding and then outputted to the outside as a digital video signal.

Analog video signals and digital video signals are outputted from the different output terminals, 29a, 29d. The reason is that once a display device is connected to an output terminal of the second adapter 3, the display device is often left connected thereto and therefore it is rather convenient to provide the different output terminals.

The present invention may be carried out as follows.

As shown in a second embodiment in FIG. 2, analog video signals and digital video signals may be outputted from the common output terminal, 29, of a second adapter 3.

The most prominent feature of the present invention is the inclusion of the first signal determination unit 15. Accordingly, optical transmission may be performed by wavelength multiplexing or digitizing an analog video signal, as in the conventional technologies.

2. Embodiment of Another Aspect of Present Invention

In another aspect, the present invention can be grasped as a technology that transmits any of an electrical signal derived from an analog video signal and an electrical signal derived from a digital video signal using light of the same wavelength. In this aspect, an embodiment as shown in FIG. 3 is also possible.

In the embodiment shown in FIG. 3, no first signal determination unit 15 is provided; an analog video signal and a digital video signal are inputted to different input terminals, 23a, 23d; and the analog video signal is converted into a modulated electrical signal by a modulator 4 and then inputted to an EO converter 7. The digital video signal is inputted directly to the EO converter 7, or subjected to predetermined coding and then inputted thereto. The other configuration is the same as that of the first embodiment. In the present embodiment, the EO converter 7 and second signal determination unit 17 have configurations similar to those in the first embodiment and therefore produce effects similar to those described in the first embodiment.

What is claimed is:

1. An adapter for use in an optical transmission system in which an analog video signal or a digital video signal is transmitted between a pair of adapters using light, the adapter comprising
   a first signal determination unit configured to make a determination as to whether a first electrical signal inputted to a common input terminal is an analog video signal or a digital video signal,
   a modulator configured to, if the first electrical signal is an analog video signal, modulate a carrier wave having a lower frequency than a transmission frequency of a digital video signal into a modulated electrical signal using the analog video signal, and
   an EO converter configured to convert any of an electrical signal derived from an analog video signal and an electrical signal derived from a digital video signal into an optical signal.

2. The adapter of claim 1, wherein the first signal determination unit makes the determination on the basis of whether the first electrical signal contains a synchronous signal.

3. The adapter of claim 1, wherein the EO converter is configured to convert any of an electrical signal derived from an analog video signal and an electrical signal derived from a digital video signal into an optical signal of an identical wavelength.

4. An optical transmission system comprising:
   a first adapter comprising the adapter of claim 3; and
   a second adapter capable of optical transmission with the first adapter, wherein
      an analog video signal or a digital video signal is transmitted between the first and second adapters using light, and the second adapter comprises:
         an OE converter configured to convert the optical signal into a second electrical signal;
         a second signal determination unit configured to make a determination as to whether the second electrical signal is derived from an analog video signal or a digital video signal; and
         a demodulator configured to, if the second electrical signal is derived from an analog video signal, demodulate the second electrical signal into the analog video signal.

5. The optical transmission system of claim 4, wherein any of an analog video signal and a digital video signal is outputted from a common output terminal of the second adapter.

6. The optical transmission system of claim 4, wherein the second signal determination unit makes the determination on the basis of strength of frequency components of the carrier wave contained in the second electrical signal.

7. An optical transmission system comprising first and second adapters, wherein
an analog video signal or a digital video signal is transmitted between the first and second adapters using light,
wherein the first adapter comprises:
a first signal determination unit configured to make a determination as to whether a first electrical signal inputted to a common input terminal is an analog video signal or a digital video signal,
a modulator configured to modulate a carrier wave having a lower frequency than a transmission frequency of a digital video signal into a modulated electrical signal using an analog video signal; and
an EO converter configured to convert any of an electrical signal derived from an analog video signal and an electrical signal derived from a digital video signal into an optical signal of an identical wavelength, and
wherein the second adapter comprises:
an OE converter configured to convert the optical signal to a second electrical signal;
a second signal determination unit configured to make a determination as to whether the second electrical signal is derived from an analog video signal or a digital video signal; and
a demodulator configured to, if the second electrical signal is derived from an analog video signal, demodulate the second electrical signal into the analog video signal, and
wherein the optical signal is either one of a signal derived from the analog video signal or a signal derived from the digital video signal.

* * * * *